United States Patent [19]
Li et al.

[11] Patent Number: 5,637,540
[45] Date of Patent: *Jun. 10, 1997

[54] SINTERED SILICON NITRIDE OF HIGH TOUGHNESS, STRENGTH AND RELIABILITY

[75] Inventors: Chien-Wei Li, Livingston; Jeffrey A. Goldacker, Somerville, both of N.J.

[73] Assignee: AlliedSignal Inc., Morristown, N.J.

[*] Notice: The portion of the term of this patent subsequent to Jun. 16, 2013, has been disclaimed.

[21] Appl. No.: 96,203

[22] Filed: Jul. 23, 1993

Related U.S. Application Data

[63] Continuation of Ser. No. 865,581, Apr. 9, 1992, abandoned, which is a continuation-in-part of Ser. No. 716,142, Jun. 17, 1991, abandoned.

[51] Int. Cl.$^6$ .................................................. C04B 35/58
[52] U.S. Cl. ........................... 501/97.2; 501/87; 501/92; 501/97.3
[58] Field of Search ........................... 501/87, 92, 97, 501/98

[56] References Cited

U.S. PATENT DOCUMENTS

| | | | |
|---|---|---|---|
| 3,890,250 | 6/1975 | Richerson | 252/516 |
| 4,184,882 | 1/1980 | Lange. | |
| 4,234,343 | 11/1980 | Andersson. | |
| 4,628,039 | 12/1986 | Mizutani et al. | 501/97 |
| 4,746,636 | 5/1988 | Yokoyama | 501/97 |
| 4,795,724 | 1/1989 | Soma et al. | 501/98 |
| 4,800,182 | 1/1989 | Izaki et al. | 501/92 |
| 4,814,301 | 3/1989 | Steinmann et al. | 501/92 |
| 4,870,036 | 9/1989 | Yeh | 501/97 |
| 4,904,624 | 2/1990 | Yeckley | 501/97 |
| 5,026,671 | 6/1991 | Hanzawa et al. | 501/92 X |
| 5,096,859 | 3/1992 | Sakai et al. | 501/97 X |
| 5,177,038 | 1/1993 | Takahashi et al. | 501/92 |

OTHER PUBLICATIONS

Ueno & Toibana, "Hot Pressed Silicon Nitride with Various Lanthanide Oxides as Sintering Additives", Yogyo–Kyokai–Shi, vol. 91, (1983) pp. 409–414.

*Primary Examiner*—Karl Group
*Attorney, Agent, or Firm*—Ernest D. Buff; Roger H. Criss

[57] ABSTRACT

A silicon nitride sintered body has a composition consisting essentially of 85 to 94% by weight β silicon nitride, 6 to 15% by weight grain boundary phase consisting essentially of (i) at least two rare earth elements, wherein yttrium is considered a rare earth, and, optionally, strontium which, calculated as SrO, is 02 percent by weight of the total body, and (ii) at least two of Si, N, O and C, and an additive consisting essentially of a metal carbon compound present in the amount of about 0.2 to 3.5% by volume. The additive is substantially homogeneously dispersed within the sintered body. The sintered body has a microstructure wherein (i) the β silicon nitride grains are acicular and have an average grain width ranging from 0.5 to 1.5 μm, (ii) at least 25% of the grains have width greater than 0.7 μm, and at least 10% of the grains have width greater than 1 μm, and (iii) no more than 5% of grains have width greater than 3.5 μm and apparent aspect ratio greater than 5, with the proviso that the average aspect ratio is at least 1.8 and a fracture origin, at least 90% of which is comprised of large acicular $\beta Si_3N_4$ grains, the average size of which ranges from about 15 to 50 μm. Such a ceramic has high strength, high toughness and long term durability, and is especially suited for industrial applications such as components for gas turbine and automotive engines.

13 Claims, 5 Drawing Sheets

SINTERED SILICON NITRIDE OF HIGH TOUGHNESS, STRENGTH AND RELIABILITY

CROSS REFERENCE TO RELATED APPLICATIONS

This application is a continuation of application Ser. No. 07/865,581, filed Apr. 9, 1992, now abandoned, which is a continuation-in-part of application Ser. No. 07/716,142, filed Jun. 17, 1991, now abandoned.

BACKGROUND OF THE INVENTION

1. Field of the Invention

This invention relates to a sintered silicon nitride ceramic having high fracture toughness, strength, and reliability, and to a method of manufacturing the same.

2. Description of the Prior Art

Silicon nitride ceramics are well known for their excellent strength at temperature in excess of 1000° C. However, at temperature greater than 1200° C. for the advanced turbine engine applications, few silicon nitride ceramics meet the strength and reliability requirements. Furthermore, conventional silicon nitride ceramics have fracture toughness typically ranging from 4 to 6 MPa·m$^{0.5}$, such low toughness makes them susceptible to significant strength degradation from the damage introduced during engine operation. It would be desirable to provide a silicon nitride having high fracture toughness, hence strong resistance to damage, high strength, and high reliability both at room and elevated temperature. Moreover, it would be most desirable to have a silicon nitride material with this combination of excellent properties which can easily be formed into near net shape parts of complex geometry.

Sintering silicon nitride requires sintering aids which form grain boundary phases. Rare earth oxides are effective sintering aids and form refractory grain boundary phases yielding silicon nitride ceramics with good high temperature properties. However, they often require high sintering temperature and/or the application of external pressure for complete densification.

Hot pressing generally produces silicon nitride ceramics with excellent strength properties. U.S. Pat. No. 4,234,343 to Anderson discloses that hot pressed silicon nitride containing different rare earth oxides as sintering aids can have 250 MPa to 550 MPa strength at 1400° C. with smaller rare earth element resulting in higher 1400° C. strength. Ueno and Toibana report in Yogyo-Kyokai-Shi, vol. 9, 409–414 (1983) that hot pressed silicon nitride containing yttria (Y$_2$O$_3$) in combination with other rare earth oxides exhibits strength of over 600 MPa at 1300° C. U.S. Pat. No. 5,021,372 discloses silicon nitridebased ceramic formed by hot pressing having room temperature 4-point bend strength ranging from about 600 to 1200 MPa and fracture toughness greater than 6 MPa·m$^{0.5}$, but the additives used in the fabrication restrict the applications of this silicon nitride to relatively low temperature. Furthermore, it is well known in the field that the process of hot pressing has limited value in the production of structural ceramics because of its shape and size limitations. It is also well known that hot pressing results in a product with anisotropic microstructure and mechanical property undesirable for most applications.

Hot isostatic pressing has the same advantages as hot pressing but without the shape, size, and anisotropy limitations. U.S. Pat. No. 4,904,624 to Yeckley teaches the fabrication of silicon nitride parts containing rare earth sintearing aid with flexural strength in excess of 525 MPa at 1370° C. using glass-encapsulated hot isostatic pressing. However, the fracture toughness of this Si$_3$N$_4$ is only 4 to 5 MPa·m$^{0.5}$. Similarly, U.S. Pat. No. 4,870,036 to Yeh teaches how to fabricate silicon nitride ceramics containing yttria and strontium compound having flexural strength greater than 465 MPa at 1375° C. using hot isostatic pressing, but the fracture toughness of this Si$_3$N$_4$ is 5 to 6 MPa·m$^{0.5}$. Thus, although hot isostatic pressing can produce silicon nitride ceramics with excellent strength, the fracture toughness of such material is low.

Gas pressure sintering is a manufacturing process for silicon nitride employing moderate nitrogen pressure during high temperature firing. It can be used to fabricate refractory silicon nitride parts without shape and size limitations. U.S. Pat. No. 4,628,039 to Mizutani et al. describes using gas pressure sintering to fabricate silicon nitride ceramics having excellent four-point bending strength at 1300° C. Said silicon nitride ceramics contain sintering aids consisting of oxides of two rare earth elements having ionic radii greater and smaller than 0.97 Å respectively, and other minor additives such as oxides of elements from Group IIa of the Periodic Table. U.S. Pat. No. 4,795,724 to Soma et al. describes gas pressure sintered silicon nitride containing at least two kinds of sintering aids, selected from Y, Er, Tm, Yb, and Lu, and having a 1400° C. flexural strength of at least 500 MPa; an example given in this patent shows that a gas pressure sintered silicon nitride ceramic containing Y$_2$O$_3$ and La$_2$O$_3$ has a strength of only 230 MPa at 1400° C. No efforts were made in the above identified inventions to fabricate a silicon nitride of unusual microstructure, toughness, flaw tolerance, and high Weibull modulus.

It has been reported that silicon nitride containing 10 to 50% by volume silicon carbide, according to U.S. Pat. No. 3,890,250, and up to 40% by volume silicon carbide, according to U.S. Pat. No. 4,184,882, has improved strength at 1400° C.; the ceramics taught by those patentees were prepared by hot pressing and their fracture toughness was not reported. U.S. Pat. No. 4,800,182 to Izaki et al. discloses a hot pressed silicon nitride/silicon carbide composite, with 5 to 30 wt. % of silicon carbide, having three-point bending strength of at least 930 MPa at room temperature and fracture toughness of 5.3 to 7 MPa·m$^{0.5}$ depending on the silicon carbide content. U.S. Pat. No. 4,814,301 to Steinmann et al. discloses the fabrication of a sintered silicon nitride using crystalline silicates and metal carbides with high retained strength at 1200° C. The strength of those silicon nitride ceramics at 1375° C. will not be high since silicates containing Na, Ca, Mg, Al, and Fe, etc. are used. Furthermore, there is no disclosure in Steinmann concerning said properties as microstructural toughness and flaw tolerance, or the importance of these properties in achieving reliable ceramics. There remains a need in the art for tough, strong, and reliable silicon nitride ceramics.

SUMMARY OF THE INVENTION

The present invention provides a silicon nitride ceramic that is tough, strong and has exceptionally high reliability. Such advantageous properties are the direct result of a unique microstructure and composition present in the sintered body. In particular, the silicon nitride ceramics of this invention evidence fracture toughness greater than 7.5 MPa·m$^{0.5}$, a four-point bending strength greater than 600 MPa at room temperature and greater than 450 MPa at 1375° C., and a Weibull modulus greater than 19. Such ceramics are processed using gas pressure sintering, and therefore can be manufactured into complex shapes easily and economically.

According to one aspect of this invention, there is provided a silicon nitride sintered body having a composition and a microstructure consisting essentially of:

(a) 85 to 94% by weight β silicon nitride;

(b) 6 to 15% by weight grain boundary phases consisting essentially of (i) at least two rare earth elements, wherein yttrium is considered a rare earth, and, optionally, strontium which, calculated as SrO, is 0 to 2 percent by weight of the total body, and (ii) at least two of Si, N, O and C; and (c) an additive consisting essentially of a metalcarbon compound present in the amount of about 0.2 to 3.5 parts by volume per 100 parts by volume of components (a) and (b), said additive being substantially homogeneously dispersed within said sintered body, said sintered body having a microstructure wherein (i) said β silicon nitride grains are acicular and have an average grain width ranging from 0.5 to 1.5 μm, (ii) at least 25% of said grains have width greater than 0.7 μm, and at least 10% of said grains have width greater than 1 μm, (iii) no more than 5% of said grains have width greater than 3.5 μm and apparent aspect ratio greater than 5, with the proviso that the average aspect ratio of all grains is at least 1.8, said sintered body having a density at least 95% of theoretical and a fracture origin, at least 90% of which is comprised of large acicular βSi$_3$N$_4$ grains and the average size of which ranges from about 15 to 50 μm. Preferably the metal-carbon compound is a carbide, nitrocarbide or oxynitrocarbide and the metal is at least one of Si, Ti, Hf, Zr, Ta, Mo and V.

According to another aspect of the present invention, there is provided a process for sintering the silicon nitride body which comprises two or more steps wherein (a) at least a first of the steps is carried out at a temperature between 1800° and 2000° C. and for a time ranging from about 1 to 10 hours in order to prepare an intermediate ceramic; (b) at least a succeeding one of the steps is carried out at a temperature ranging from about 2000° to 2100° C. and for a time ranging from about 1 to 10 hours in order to heat treat the intermediate ceramic; (c) each of the steps being carried out under nitrogen pressure sufficiently high to avoid decomposition of silicon nitride, and the temperature of the succeeding steps being at least 25° C. greater than that of the first of the steps.

According to the present invention, there is further provided a silicon nitride ceramic body that has fracture toughness greater than 7.5 MPa·m$^{0.5}$ when measured by the Chevron-notch technique described hereinbelow; R-curve behavior and damage resistance properties which are reflected by the ceramic body's indentation strength, as defined hereinbelow, greater than 500, 400, 350, 300, 270 and 220 MPa at indentation loads of 1, 5, 10, 20, 30 and 50 kg, respectively; and a four point flexural strength of at least 600 MPa at room temperature and at least 450 MPa at 1375° C.

The invention further provides a damage resistant silicon nitride ceramic that has fracture toughness greater than 7.5 MPa·m$^{0.5}$, a four-point flexural strength of at least 790 MPa at room temperature with a Weibull modulus of at least 19, a stress rupture lifetime of at least 100 hours at 1200° C. under 480 MPa stress, and a four-point flexural strength of at least 450 MPa at 1375° C. Said silicon nitride consists essentially of:

(a) 85 to 94% by weight β silicon nitride;

(b) 6 to 15% by weight grain boundary phases consisting essentially of (i) at least two rare earth elements wherein yttrium is considered a rare earth, and Sr ranging from 0 to 2 percent by weight of the total body when calculated as SrO, and (ii) at least two of Si, N, O, and C; and (c) an additive consisting essentially of silicon carbide particulate with an average size less than 2 μm in the amount ranging from about 0.5 to 1.9 parts by volume per 100 parts by volume of the components (a) and (b), said sintered body having a microstructure wherein (1) said β silicon nitride grains are acicular and have an average grain width ranging from 0.5 to 0.8 μm, (ii) at least 25% of said grains have width greater than 0.6 μm, and at least 10% of said grains have width greater than 0.9 μm, (iii) less than 5 percent of the grains have width greater than 2.5 μm and apparent aspect ratio greater than 5, with the proviso that the average apparent aspect ratio of all grains is at least about 1.8, the sintered body having a density at least 97% of theoretical and a fracture origin, at least 90% of which is comprised of large acicular βSi$_3$N$_4$ grains and the average size of which ranges from 15 to 30 μm.

The invention further provides a process for making such silicon nitride. Said process consists of firing in the temperature range of 1500° C. to 2045° C., wherein (a) an initial sintering is carried out at temperatures between 1500° and 1850° C. for a time greater than one but less than eight hours; (b) an intermediate sintering is carried out at temperatures between 1850° and 2000° C. for at least 30 minutes but less than five hours; (c) a final sintering is carried out at temperatures ranging from about 2000° to 2045° C. and for a time ranging from about one to five hours; (d) each of the steps being carried out under nitrogen pressure sufficiently high to avoid decomposition of silicon nitride, and the temperature of the succeeding steps being at least 25° C. greater than that of the first of the steps.

According to the last aspect of this invention, there is provided a postsintering heat treatment of this silicon nitride body that preserves its excellent toughness. This treatment can be a crystallization heat treatment during cooling from the sintering temperature or during a reheating step, or it can be an annealing heat treatment for a silicon nitride containing primarily crystalline grain boundary phases. As a result of that treatment, the grain boundary phases are substantially crystalline and are formed or recrystallized by the annealing. Such post-sintering crystallization or annealing is carried out at a temperature greater than 1375° C., and preferably greater than 1450° C.

Advantageously, the silicon nitride of this invention is fabricated by a gas pressure sintering process which does not have the shape and size limitations of hot pressing, and which does not require the encapsulation and de-encapsulation steps and the high gas pressure of hot isostatic pressing. The combination of excellent properties and ease of fabrication makes the silicon nitride ceramics of the present invention most suitable for industrial applications such as components for gas turbine and automotive engines and as cutting tools.

DETAILED DESCRIPTION OF THE PREFERRED EMBODIMENTS

Figure 1:
FIG. 1 is a transmission electron micrograph of the grain boundary phase referenced in example No. 11, electron diffraction indicates that the grain boundary phase is primarily glassy.

Three requirements have to be met concurrently to manufacture a high toughness, high strength (room temperature and 1375° C.) and reliable silicon nitride ceramic: (1) the grain boundary phase must be refractory so that the 1375° C. strength can be high; (2) the ceramic must be dense and halve an optimum microstructure consisting of whisker-like β $Si_3N_4$ grains; and (3) the grain boundary must be weak for sufficient debonding along the grain boundary of the whisker-like β $Si_3N_4$ grain to take place. Details for selecting conditions to manufacture a silicon nitride to meet all these requirements are set forth hereinafter.

In principle, the sintered body of the present invention is formed by sintering a composition comprising (a) silicon nitride, (b) rare earth compounds and optional strontium compound as sintering aids, and (c) metal-carbon compounds. In this composition, component (a) should be present in an amount 85 to 94 percent by weight, and the component (b) should be present in an amount 6 to 15 percent by weight to make up the 100 percent. In addition, component (c) should be present in an amount about 0.2 to 3.5 parts by volume per 100 parts by volume of components (a) and (b).

The product of this invention should comprise no less than 85 weight percent silicon nitride so that the volume fraction of the grain boundary phases is not too high as excessive grain boundary phase may degrade the fracture toughness and high temperature properties. However, the amount of silicon nitride should be no more than 94 weight percent so that the quantity of liquid phase for sintering is sufficient for densification to proceed to at least 95 percent of theoretical density.

The product of the present invention is fabricated by adding about 6 to 15 percent by weight sintering aids which form grain boundary phases. Sintering aids consisting of $Y_2O_3$, ranging from 1 to 5% by weight, $La_2O_3$, ranging from 3 to 7%, and SrO, ranging from 0 to 2% by weight, may be used for enhancing densification. While said oxides are effective sintering aids and are used in the present invention, it is well known in the field that all rare earth oxides can be effective and refractory sintering aids, and may, therefore, be employed to fabricate the product of this invention. One reason for selecting a composition of at least two rare earth compounds and optional strontium compound is to reduce the liquidus temperature of the system so that densification and microstructure development can be accomplished by processes other than hotpressing or hot isostatic pressing. The amount of strontium added when calculated as SrO should be no greater than 2% by weight so that the high temperature properties will not be degraded. Another reason for selecting said composition is that the resulting grain boundary phases have good debonding property and yield ceramics with high fracture toughness.

Another requirement in the fabrication of the product of this invention is to add at least one metal-carbon compound in the powder mixture. The amount of metal-carbon compounds should not exceed 3.5% by volume in order to permit sintering to full density, and should be at least 0.2% by volume in order to be effective. The metal-carbon compound used in the fabrication can be crystalline or amorphous. It can be carbide, nitrocarbide or oxycarbonitride. It can also be introduced via a chemical reaction of a carbon bearing species in gas, liquid or solid state with metallic species which eventually forms a metal-carbon compound in the silicon nitride ceramics.

The metal-carbon compound addition improves the strength properties through moderation of the grain growth kinetics during sintering thus resulting in a more uniform and finer microstructure, and through the modification of grain boundary properties. During sintering, two possible reactions occur in the product of this invention owing to the addition of metal-carbon compound. First, the metalcarbon compound can partially dissolve into liquid phase at sintering temperature, and because carbon has strong bonding with other cation elements such as silicon and rare earth in the liquid, the viscosity of the liquid can be increased. Second, excess metal-carbon compound particles at grain boundaries can inhibit grain boundary migration. The combination of these two effects can suppress exaggerated grain growth and result in a more uniform and finer microstructure as compared to the microstructure of a similarly processed silicon nitride which does not contain metal-carbon compound. This more uniform and finer microstructure affords production of ceramic parts having high strength. Incorporating carbon in the grain boundary glassy phase also improves its rigidity and as a result the high temperature strength of the sintered silicon nitride improves. Similar effects of carbon on the properties of oxycarbonitride and oxycarbide glasses have been reported by, for instance, J. Homeny et al, J. Am. Ceram. Soc., 70 [5] C114 (1987).

According to this invention, a desirable microstructure and grain boundary property yielding high toughness and high strength can be generated by sintering the silicon nitride powder compact of afore-defined compositions by a special process consisting of at least two temperature steps.

The purpose for the first firing step is to prepare an intermediate ceramic of about 70 to 95 percent theoretical density comprising a high density of whisker-like β $Si_3N_4$ grains of uniform sizes nucleated and grown in situ through the transportation of atoms via vapor and liquid phases. The formation of this intermediate microstructure is possible since the powder compact initially had high pore volume providing room for β $Si_3N_4$ grain to grow along its c axis under the anisotropic surface energy driving force. This incorporation of high density of whisker in the ceramic body can not be achieved by traditional ceramic processing means without problems such as agglomeration and poor green density which translate to sintered parts of poor quality. The firing temperature should be greater than 1800° C. so that the nucleation and growth rates for the whisker-like β $Si_3N_4$ grain are adequate. It should be less than 2000° C. because higher temperatures during this step renault in exaggerated growth of silicon nitride grains which can eventually lead to a ceramic body of undesirable microstructure. In addition, the firing time should range from about one to 10 hours to allow sufficient amount of whisker-like β $Si_3N_4$ grains to develop while controlling grain coarsening so that densification and development of desirable microstructure proceeds.

The intermediate ceramic is then further sintered at a temperature ranging from 2000° C. to 2100° C. for a time ranging from 1 to 10 hours in order to form a final ceramic body reaching at least 95 percent of theoretical density and to further develop the in-situ grown, whisker-like β $Si_3N_4$ grains. A temperature higher than 2000° C. and at least 25° C. higher than that of the first step is selected in order to complete the densification of the ceramic and to generate a large quantity of whisker-like β $Si_3N_4$ grains. The temperature is limited to less than 210020 C. because at temperatures in excess of 2100° C. the process of grain coarsening becomes significant and has undesirable effects on microstructure. The heat treating time should range from 1 to 10 hours so that sufficient densification and grain growth occur for the desirable microstructure to form.

The sintering and heat treating steps are carried out under elevated pressure of nitrogen gas or of a mixture of $N_2$ with one or more inert gases such as Ar or He. Further, in order to prevent excessive decomposition of silicon nitride during the sintering and heat treating steps, it is preferred that the nitrogen pressure is not less than 3.3, 8, 23, 30 and 50 atm at 1800, 1900, 2000, 2050, and 2100° C., respectively.

A further improved silicon nitride having a more uniform microstructure, and exhibiting improved room temperature strength characteristics and high temperature long term durability, can be manufactured using a sintering process consisting essentially of an initial firing between 1500° and 1850° C. for more than one but less than eight hours, an intermediate firing between 1850° and 2000° C. for at least 30 minutes but less than five hours, and a final firing between 2000° and 2045° C. for at least one hour but no more than 5 hours. Such sintering process creates a particularly uniform microstructure through modifying the nucleation and growth kinetics of the whisker-like β $Si_3N_4$ grains.

If the silicon nitride fabricated using the conditions described hereandabove is cooled relatively fast from the sintering temperature so that the liquid phase form glass between the $Si_3N_4$ grains, its microstructure and grain boundary phase property is sufficient to yield a ceramic body with chevron-notch fracture toughness greater than 7.5 MPa·m$^{0.5}$ and damage resistance properties. However, if the silicon nitride is slow-cooled or heat-treated after the sintering so that it contains primarily crystalline grain boundary phases, damage resistance properties of said silicon nitride ceramic are found, unexpectedly, to depend strongly on the temperature at which the major crystallization event takes place. If this event takes place either during cooling or in a reheating process at 1375° C. or lower temperatures, the grain boundary property changes which results in significant reduction of damage resistance. On the other hand, if the major crystallization process takes place at temperatures above 1375° C., more preferably above 1450° C., the damage resistance property remains about the same as that of the silicon nitride ceramic without the crystallization heat treatment. Moreover, we have unexpectedly found that for silicon nitride ceramics which have lost some of their damage resistance as a result of grain boundary phase crystallization at 1375° C. or lower temperatures, an annealing process at temperature greater than 1375° C. can restore the material's fracture toughness.

The following is a brief description of a general procedure for manufacturing the final silicon nitride ceramic of the present invention:

First, a homogeneous mixture of powders is formed by known methods. The mixture is prepared by blending and milling powders of silicon nitride (85 to 94 wt. %) and sintering aids (6 to 15 wt. %) consisting primarily of compounds of at least two rare earth elements and optional compound of Sr, and additionally 0.2 to 3.5 volume percent of at least one metal-carbon compound. Said compounds of rare earth elements are preferably oxides, and said metal-carbon compound is preferably a carbide. The powder mixture is then formed into the desired shape by slip casting, cold isostatic pressing, die forming, or other conventional ceramic manufacturing techniques.

The green ceramic body is then first fired at a temperature from 1800° to 2000° C. for 1 to 10 hours to form an intermediate ceramic body, and then fired at temperatures between 2000° and 2100° C. for 1 to 10 hours to yield a sintered silicon nitride body. These firing steps will be referred to as the sintering and grain growth process. At furnace temperatures above 1800° C. gaseous atmospheres of elevated pressure and having sufficient nitrogen partial pressure to prevent silicon nitride decomposition are used.

Improved silicon nitride compositions having a more uniform microstructure and higher strength, toughness and long term durability are manufactured in accordance with this invention by firing the ceramic in the temperature range of 1500° C. to 2045° C., wherein (a) an initial sintering is carried out at temperatures between 1500° and 1850° C. and preferably between 1650° and 1850° C., for a time greater than one but less than eight hours, and preferably greater than 2 but less than 6 hours; (b) an intermediate sintering is carried out at temperatures between 1850° and 2000° C., and preferably between 1900° and 1975° C. for at least 30 minutes but less than five hours, and preferably for at least 60 minutes but less than 3 hours; (c) a final sintering is carried out at temperatures ranging from about 2000° to 2045° C. and preferably from about 2010° to 2035° C. and for a time ranging from about one to five hours and preferably from about 1 to 3 hours; (d) each of the steps being carried out under nitrogen pressure sufficiently high to avoid decomposition of silicon nitride, and the temperature of he succeeding steps being at least 25° C. greater than that of the first of the steps.

After the completion of the sintering and grain growth process, the silicon nitride is cooled relatively fast so that the majority of the grain boundary phase remains amorphous, and then reheated to a temperature above 1375° C. for crystallization. It can also be cooled down from the sintering temperature in a controlled way so that at least 90% of the grain boundary phase crystallizes at temperature above 1375° C., and more preferably above 1450° C. The grain boundary phase can also be crystallized at temperature below 1375° C. first, and then annealed at temperature above 1375° C., and more preferably at temperature above 1450° C.

The mechanical properties of the silicon nitride ceramic are readily measured by use of standard tests. In particular, fracture strength measurement is carried out by cutting the material into 3 mm by 4 mm by 50 mm bars, loading the bar on a four-point bend fixture with 20 mm and 40 mm inner and outer spans, and fracturing the bar with test machines using a 5 mm/min. loading rate. High temperature testing is conducted using the specimen dimensions described above, and using silicon carbide fixtures having the same spans as the above described. For stress rupture testing, a dead weight is applied to the specimen under four-point bend until the specimen fails or testing time reaches 100 hours.

An optical microscope is applied to examine the fracture surface of the broken bars to identify the fracture origins. The predominant fracture origin for the silicon nitride of this invention is a large acicular β$Si_3N_4$ grain. The size of the fracture origin hereby defined to be equal to $(ld)^{1/2}$ where l and d are the length and width, or the maximum and the minimum projections of the acicular β$Si_3N_4$ grain, respectively. At least five, preferably more than ten, four-point flexure bars should be fractured to determine the average β $Si_3N_4$ fracture origin size of a sample.

A Chevron-notch method is used for fracture toughness measurement. A Chevron-notched specimen 6.35 mm by 6.35 mm by 25.4 mm is subjected to a three-point bend test using an 38.1 outer span and loading rate 0.0127 mm/min. The said method is adopted in the Advanced Turbine Technology Applications Project of the Department of Energy of the U.S. Government for structural ceramic materials evaluation and selection.

The indentation strength measurement is carried out by preparing 3 mm by 4 mm by 50 mm bars, diamond polishing the tensile surface down to 1 μm finish, indenting at the middle of the polished surface with Vickers indenter to generate cracks, two of which are parallel to the edges of the bar, and then fracturing using the procedure described above for strength testing. Since the silicon nitride ceramic body of this invention possesses R-curve behavior, a range of Vickers indentation loads ranging from 1 kg to 50 kg should be used to unequivocally characterize this property.

The microstructure and grain size of silicon nitride are characterized using scanning electron microscopy and an image analyzer. The sample is prepared by polishing the surface to be examined down to 1 μm finish using diamond paste, etching with molten NAOH at 400° C. for 26 minutes, and coating the specimen with a conducting material like gold. The image analyzer can map out the morphology and dimensions of individual silicon nitride grains. For each specimen at least 3000 grains are measured. The minimum and maximum projections for each grain are defined as the grain width and grain length, respectively. The apparent aspect ratio is calculated by dividing the maximum projection (grain length) by the minimum projection (grain width).

The following examples are presented to provide a more complete understanding of the invention. The specific technique, conditions, materials, proportions and reported data set forth to illustrate the principles and practice of the invention are exemplary and should not be construed as limiting the scope of the invention.

EXAMPLE 1

The starting compositions for silicon nitride ceramics used in this example are shown in Table 1(a). A raw material powder of $Si_3N_4$ with alpha content of 96% and containing less than 100 ppm of metallic impurities such as Fe, Al, Ca, Na, or K and 1 percent by weight of oxygen and having an average grain size of 0.6 μm and a specific surface area of ~13 $m^2$/g was used. Yttrium oxide ($Y_2O_3$) and lanthanum oxide ($La_2O_3$) with purity of more than 99% by weight and average grain size less than 10 micrometers were used in the proportions as shown in Table 1(a). Strontium carbonate (99% pure, ~1 μm average size) was used as the precursor for strontium oxide (SrO): one hundred parts by weight strontium carbonate yields 70 parts by weight SrO. Appropriate amounts of strontium carbonate were used to yield strontium oxide with the weight percentages shown in Table 1(a). The quantity of metal carbide (99% pure, average size ranging from 0.2 μm to 5 μm) shown in Table 1(a) was calculated as a percentage of the total volume. For each compound, its amount in volume is equal to its amount in weight divided by its density. The densities for pure $Si_3N_4$, $Y_2O_3$, $La_2O_3$, SrO, SiC, TiC, HfC, and TaC compounds are 3.2, 5.0, 6.5, 4.7, 3.2, 4.9, 12.2, and 13.9 $g/cm^3$, respectively.

TABLE 1(a)

| Sample No. | $Si_3N_4$ (wt %) | $Y_2O_3$ (wt %) | $La_2O_3$ (wt %) | SrO (wt %) | MC Compound (volume %) |
|---|---|---|---|---|---|
| 1* | 92 | 1.8 | 5.4 | 0.8 | |
| 2* | 92.2 | 1.8 | 5.6 | 0.4 | |
| 3* | 90 | 2 | 6 | 2 | |
| 4* | 90 | 2 | 6 | 2 | |
| 5* | 92 | 1.8 | 5.4 | 0.8 | 4 SiC |
| 6* | 88 | 2.5 | 7.5 | 2 | 4 SiC |
| 7* | 92 | 1.8 | 5.4 | 0.8 | 6 SiC |
| 8* | 92 | 1.8 | 5.4 | 0.8 | 0.5 SiC |
| 9* | 92 | 1.5 | 4.5 | 2 | 1 SiC |
| 10 | 92 | 1.8 | 5.4 | 0.8 | 0.5 SiC |
| 11 | 92 | 1.8 | 5.4 | 0.8 | 1 SiC |
| 12 | 92 | 2 | 6 | 0 | 1 SiC |
| 13 | 90 | 2 | 6 | 2 | 1 SiC |
| 14 | 91.2 | 4.7 | 3.3 | 0.8 | 1 SiC |
| 15 | 92 | 2.7 | 3.9 | 1.4 | 1.5 SiC |
| 16 | 92 | 1.7 | 4.9 | 1.4 | 1.5 SiC |
| 17 | 92 | 1.7 | 4.9 | 1.4 | 1.5 SiC |
| 18 | 92 | 1.8 | 5.4 | 0.8 | 0.5 HfC |
| 19 | 92 | 1.8 | 5.4 | 0.8 | 0.3 HfC |
| 20 | 92 | 1.8 | 5.4 | 0.8 | 0.7 TiC |
| 21 | 92 | 1.8 | 5.4 | 0.8 | 0.7 TiC |
| 22 | 92 | 1.8 | 5.4 | 0.8 | 0.3 TaC |

The formulated mixture weighing 350 g was wet-milled for 24 hours in a one liter high density polyethylene bottle with 500 mL isopropanol and with 2 kg silicon nitride grinding media. The milled slurry was vacuum dried, and the resulting powder sieved through a 60 mesh nylon screen. The sieved powder was isostatically pressed at a pressure 200–300 MPa to obtain green compacts of approximately 25 mm by 25 mm by 60 mm. The green compacts were fired under conditions shown in Table 1(b). The properties measured for these samples are shown in Table 1(c).

TABLE 1(b)

| Sample No. | Temperature 1 (°C.) | Time 1 (hr) | Max. Pressure 1 (atm) | Temperature 2 (°C.) | Time 2 (hr) | Max. Pressure 2 (atm) |
|---|---|---|---|---|---|---|
| 1* | 1975 | 3 | 20 | | | |
| 2* | 1975 | 3 | 21 | 2000 | 2.5 | 100 |
| 3* | 1950 | 4 | 17 | 2050 | 4 | 80 |
| 4*a | 1700 | 2 | 2000 | | | |
| 5* | 1975 | 3 | 20 | 2025 | 3 | 30 |
| 6* | 1975 | 3 | 20 | 2025 | 3 | 100 |
| 7* | 1975 | 3 | 20 | 2025 | 3 | 100 |
| 8* | 1975 | 3 | | | | |
| 9* | 1975 | 1.5 | 20 | | | |
| 10 | 1950 | 4 | 20 | 2025 | 4 | 80 |
| 11 | 1975 | 3 | 20 | 2025 | 3 | 100 |
| 12 | 1975 | 3 | 20 | 2025 | 3 | 100 |
| 13 | 1975 | 3 | 20 | 2010 | 3 | 100 |
| 14 | 1850 | 4 | 10 | 2025 | 3 | 100 |
| 15 | 1975 | 3 | 20 | 2025 | 3 | 100 |
| 16 | 1850 | 4 | 10 | 2025 | 3 | 100 |
| 17 | 1975 | 3 | 10 | 2025 | 3 | 100 |
| 18 | 1975 | 2 | 20 | 2050 | 2 | 100 |
| 19 | 1975 | 3 | 20 | 2025 | 3 | 100 |
| 20 | 1975 | 3 | 20 | 2025 | 3 | 100 |
| 21 | 1950 | 6 | 15 | 2050 | 2 | 200 |
| 22 | 1975 | 3 | 20 | 2050 | 2 | 400 |

Note
a green billets glass encapsulated

TABLE 1(c)

| Sample No | Relative Density (%) | Strength at 25° C. (MPa) | Strength at 1375° C. (MPa) | Fracture Toughness (MPa·m$^{0.5}$) |
|---|---|---|---|---|
| 1* | 88 | | | |
| 2* | 100 | 630 | 412 | 9.0 ± 0.2 |
| 3* | 98.9 | 590 | 372 | 11.6 ± 0.7 |
| 4* | 100 | 965 | 532 | 5.6 |
| 5* | 93 | | | |
| 6* | 98.7 | 847 | 449 | 7.1 ± 0.1 |
| 7* | 85 | | | |
| 8* | 93.7 | | | |
| 9* | 82 | | | |
| 10 | 99.3 | 748 | 486 | 9.0 ± 0.3 |
| 11 | 99.4 | 777 | 515 | 8.7 ± 0.1 |
| 12 | 100 | 759 | 519 | 8.6 ± 0.1 |
| 13 | 100 | 789 | 488 | 8.4 ± 0.1 |
| 14 | 99.4 | 757 | 450 | 7.8 ± 0.1 |
| 15 | 98.4 | 736 | 450 | 8.1 |
| 16 | 100 | 816 | 473 | 8.2 ± 0.2 |
| 17 | 100 | 821 | 459 | 8.1 ± 0.3 |
| 18 | 100 | 658 | 456 | 9.0 |
| 19 | 100 | 708 | 495 | 9.2 ± 0.1 |
| 20 | 98.2 | 731 | 490 | 8.5 ± 0.1 |
| 21 | 100 | 723 | 511 | 9.3 |
| 22 | 100 | 654 | 479 | 8.6 ± 0.1 |

Note
*outside the scope of the present invention

Sample Nos. 1 to 9 either have 1375° C. strength lower than 450 MPa, or fracture toughness less than 7.5 MPa·m$^{0.5}$, or density less than 95 percent of theoretical. Notice that sample Nos. 1 to 4 did not contain metal carbide compound and sample Nos. 1, 4, 8, and 9 were fired using conditions outside the specification of this invention. Sample Nos. 1, 8 and 9 demonstrate that sintering at 1975° C. only cannot achieve densification greater than 95 percent of theoretical density and hence the properties of the ceramic are expected to be poor. Sample Nos. 2 and 3 demonstrate that the strength of the ceramic in the absence of carbide addition is generally low although the fracture toughness is high. Sample No. 4 shows that sintering by glassencapsulation hotisostatic pressing yields silicon nitride ceramics with excellent strength but poor fracture toughness. Sample Nos. 5 and 7 did not densify to greater than 95 percent theoretical density because the silicon carbide content was excessive and the materials could not be gas pressure sintered. Note that sample No. 6 is sintered using the same schedule as sample No. 5, and has the same amount (4% by volume) of carbide additive, but is able to reach density greater than 95% of theoretical because the amount of sintering aids is 4% by weight more. Notice that its strength and fracture toughness are slightly below that of the present invention.

In contrast, it is seen that samples Nos. 10 through 22 simultaneously have high density, fracture toughness above 7.5 MPa·m$^{0.5}$, room temperature strength greater than 600 MPa, and 1375° C. strength greater than 450 MPa. These samples are silicon nitride sintered bodies consisting of 85 to 94 percent by weight silicon nitride grains. The balance to 100 percent is grain boundary phases, primarily consisting of at least two rare earth elements and minor Sr in the amount 0 to 2 weight percent when calculated as SrO, and other elements like Si, N, O, C, and impurities. In addition, these samples contain less than 3.5 but greater than 0.2 volume percent of carbides. The sintered bodies are prepared using a schedule comprising two steps of which the first one is carried out at temperatures between 1800° and 2000° C. and for a time from 2 to 6 hours and the second step is carried out at temperatures ranging from 2010° C. to 2050° C. and for a time between 2 and 4 hours.

In Table 2, indentationstrength data for sample Nos. 4, 6, 11, 14 and 20 of Table 1 are compared.

TABLE 2

| Sample No. | Strength | | (MPa) after Indentation at indicated Load | | | |
|---|---|---|---|---|---|---|
| | 1 Kg | 5 Kg | 10 Kg | 20 Kg | 30 Kg | 50 Kg |
| 4* | 493 | 336 | 259 | 221 | 197 | 188 |
| 6* | 665 | 418 | 333 | 290 | 264 | 220 |
| 11 | 623 | 453 | 398 | 352 | 330 | 283 |
| 14 | 614 | 420 | 376 | 315 | 283 | 232 |
| 20 | 648 | 453 | 389 | 363 | 301 | 285 |

Note:
*outside the scope of the present invention

At a Vickers indentation load of 1, 5, 10, 20, 30, and 50 kg, respectively, the indentation or residual strengths of sample No. 4 are the lowest, reflecting the low fracture toughness of this hot isostatically pressed silicon nitride. The indentation strength of sample No. 6, which has a Chevron-notch fracture toughness of 7 1 MPa·m$^{0.5}$, at indentation load greater than 5 kg are all lower than the corresponding strengths for sample Nos. 11, 14, and 20. This demonstrates the Rcurve and damage resistance property of the product of this invention.

Figure 2:
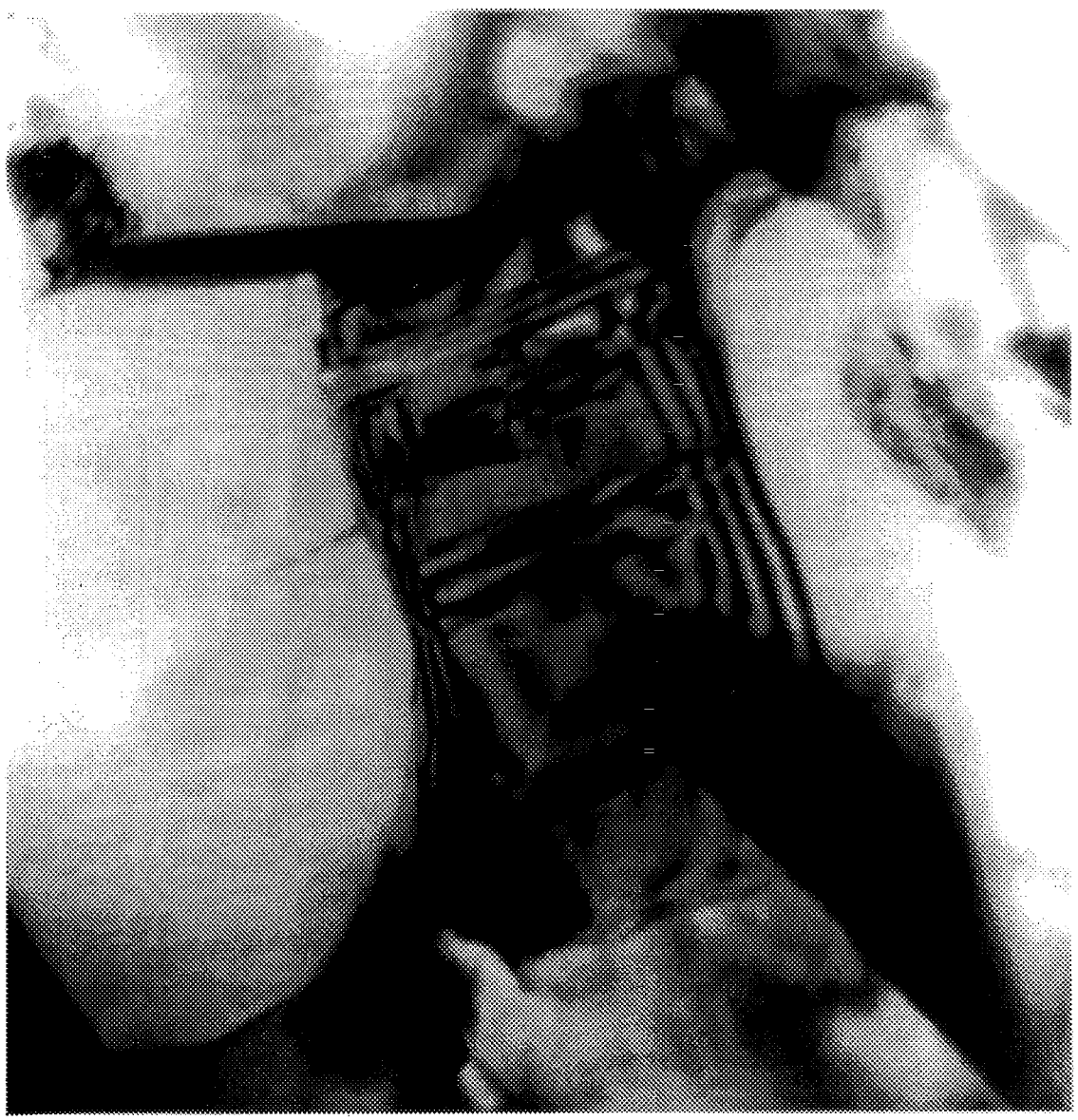
FIG. 2 is a transmission electron micrograph of heat treated sample No. 11 showing Si$_3$N$_4$ grains, crystalline grain boundary phasers, and a SiC particle.

After the sintering, the cooling rate for all samples in Table 1 was ~80° C./min. from ~2000° C. to 1600° C., and ~40° C./min. from 1600° C. to 1000° C. This cooling schedule generates sintered silicon nitride comprising primarily glassy grain boundary phase. FIG. 1 is a Transmission Electron Microscope (TEM) micrograph of sample No. 11 showing the grain boundary phase remains amorphous. FIG. 2 is the TEM micrograph of sample No. 11 heat treated at 1300° C. in nitrogen for 5 hours showing a SiC particle adjacent to Si$_3$N$_4$ grains and crystalline grain boundary phases.

EXAMPLE 2

In the same manner as described in Example 1, cold isostatically pressed bodies were prepared by using compositions shown in Table 3(a), sintered using the conditions shown in Table 3(b). The properties of the sintered silicon nitride are listed in Table 3(c). In Table 3(d), the microstructural features including average grain width, grain width at 75, 90, 95, and 99 percent cumulative frequency, average aspect ratio, and aspect ratio at 95 percent cumulative frequency are listed.

TABLE 3(a)

| Sample No. | Si$_3$N$_4$ (wt %) | Y$_2$O$_3$ (wt %) | La$_2$O$_3$ (wt %) | SrO (wt %) | MC Compound (volume %) |
|---|---|---|---|---|---|
| 23* | 92 | 1.8 | 5.4 | 0.8 | |
| 24* | 90 | 2 | 6 | 2 | |
| 25 | 92 | 1.8 | 5.4 | 0.8 | 0.5 SiC |
| 26 | 92 | 1.8 | 5.4 | 0.8 | 1 SiC |
| 27 | 92 | 1.5 | 4.5 | 2 | 1 SiC |
| 28 | 92 | 1.8 | 5.4 | 0.8 | 2 SiC |

TABLE 3(b)

| Sample No. | Temperature 1 (°C.) | Time 1 (hr) | Max. Pressure 1 (atm) | Temperature 2 (°C.) | Time 2 (hr) | Max. Pressure 2 (atm) |
| --- | --- | --- | --- | --- | --- | --- |
| 23* | 1960 | 4 | 20 | 2050 | 2 | 80 |
| 24* | 1960 | 4 | 60 | 2050 | 3 | 80 |
| 25 | 1975 | 3.5 | 20 | 2025 | 3 | 100 |
| 26 | 1975 | 3 | 20 | 2025 | 3 | 100 |
| 27 | 1975 | 3 | 20 | 2025 | 3 | 100 |
| 28 | 1975 | 3.5 | 20 | 2025 | 3 | 100 |

TABLE 3(c)

| Sample No | Relative Density (%) | Strength at 25° C. (MPa) | Strength at 1375° C. (MPa) | Fracture Toughness (MPa·m^0.5) |
| --- | --- | --- | --- | --- |
| 23* | 1008 | 620 | 345 | 10.0 ± 0.3 |
| 24* | 100 | 667 | 355 | 8.9 ± 0.5 |
| 25 | 99.5 | 661 | 511 | 8.7 ± 0.1 |
| 26 | 100 | 802 | 578 | 8.5 ± 0.1 |
| 27 | 99 | 781 | 498 | 8.5 ± 0.3 |
| 28 | 99.5 | 866 | 494 | 7.9 ± 0.2 |

TABLE 3(d)

| Sample No | Cumulative Grain Width ($\mu$m) Distribution | | | | | Aspect Ratio Distribution | |
| --- | --- | --- | --- | --- | --- | --- | --- |
| | Average | 75% | 90% | 95% | 99% | Average | 95% |
| 23* | 1.4 | 1.7 | 2.5 | 3.3 | 5.4 | 2.0 | 3.8 |
| 24* | 1.0 | 1.2 | 1.7 | 2.0 | 3.1 | 2.1 | 4.0 |
| 25 | 0.8 | 1.0 | 1.3 | 1.6 | 2.3 | 2.0 | 3.6 |
| 26 | 0.8 | 1.0 | 1.4 | 1.8 | 2.7 | 1.9 | 3.5 |
| 27 | 0.7 | 0.9 | 1.2 | 1.5 | 2.1 | 2.0 | 3.7 |
| 28 | 0.7 | 0.8 | 1.1 | 1.3 | 2.0 | 2.0 | 3.8 |

Note
*outside the scope of this invention

From Table 3(c), we see that sample No. 23 has the highest fracture toughness but lowest room temperature strength, while sample No. 28 has the lowest fracture toughness but highest room temperature strength. From Table 3(d), we see that sample No. 23 has the coarsest while sample No. 28 has the finest microstructure. This microstructure and mechanical properties correlation can be understood in terms of Rcurve behavior of the material (see, for instance, P. Chantikul et al, J. Am. Ceram. Soc., 73 [8] 2419 (1990)).

Moreover, sample No. 23 has a room temperature strength (620 MPa) close to the lowest strength for product of this invention, whereas sample No. 28 has a fracture toughness (7.9±0.2 MPa·m^0.5) close to the lowest fracture toughness for product of this invention. Hence, silicon nitride ceramics with microstructural parameters between that of sample No. 23 (coarse microstructure) and sample No. 28 (fine microstructure) will have fracture toughness and room temperature strength greater them about 7.5 MPa·m$^{0.5}$ and 600 MPa, respectively. Said silicon nitride ceramics are represented by sample Nos. 24 to 27.

Thus, from data shown in Table 3(a) to (d), it can be seen that sintered silicon nitride ceramics with fracture toughness greater than 7.5 MPa·m$^{0.5}$ and room temperature and 1375° C. strengths greater than 600 and 450 MPa, respectively, have average grain width greater than 0.5 $\mu$m but less than 1.5 $\mu$m, and at least 25 percent of the total number of silicon nitride grains having width greater than 0.7 $\mu$m, and at least 10 percent of the silicon nitride grains having width greater than 1 $\mu$m, and less than 5 percent of the grains having width greater than 3.5 $\mu$m and apparent aspect ratio greater than 5, and an average apparent aspect ratio of at least about 1.8, and have grain boundary phases primarily consisting of at least two rare earth elements and minor Sr in the amount of 0 to 2 weight percent when calculated as SrO and other elements such as Si, N, O, and C, and 0.2 to less than 3.5 volume percent of metal-carbon compounds.

EXAMPLE 3

Sample Nos. 11, 19, 20, 22, 27 and 28 of Tables 1 and 3 were heat treated at various temperatures to crystallize the grain boundary phase, or/and crystallized first at a lower temperature and then further annealed or recrystallized at a higher temperature. The heat-treatment conditions and the indentation strength after the heat treatment are listed in Table 4.

TABLE 4

| Sample No. | Crystallization Temperature | Strength (MPa) after indentation at indicated load | |
| --- | --- | --- | --- |
| | | 1 kg | 10 kg |
| 11a* | 1300° C. | 388 | 228 |
| 11b | 1450° C. | 504 | |
| 11c | 1500° C. | 604 | |
| 19* | 1300° C. | | 158 |
| 20* | 1300° C. | 284 | |
| 22 | 1550° C. | 634 | |
| 27a* | 1300° C. | 525 | 310 |
| 27b | 1300° C. + 1385° C. | 731 | |
| 28a* | 1300° C. | 299 | 285 |
| 28b | 1300° C. + 1500° C. | 590 | 385 |
| 28c* | 1050° C. + 1300° C. | 482 | 325 |
| 28d | 1050° C. + 1385° C. | 578 | 396 |
| 28e | 1050° C. + 1420° C. | 667 | 387 |
| 28f | 1450° C. | 552 | |
| 28g | 1500° C. | 583 | |
| 28h | 1550° C. | 623 | 375 |

Note
*outside the scope of the present invention

We can see that sample Nos. 11a, 19, 20, 27a, 28a, and 28c which were crystallized at 1300° C. lost a significant fraction of their damage resistance property as indicated by the low indentation strength, whereas a further annealing at temperatures not lower than 1375° C. (sample Nos. 27b, 28b, and 28d) leads to recovery of the damage resistance property, i.e. high indentation strength. Furthermore, all samples crystallized at temperatures greater than 1375° C. have indentation strengths similar to that of the samples containing primarily amorphous grain boundary phase.

EXAMPLE 4

The starting compositions for the silicon nitride ceramics in this example are all within the scope of this invention, and they are shown in Table's 5(a) and 6(a).

TABLE 5(a)

| Sample No | $Si_3N_4$ (wt %) | $Y_2O_3$ (wt %) | $La_2O_3$ (wt %) | SrO (wt %) | SiC (volume %) |
| --- | --- | --- | --- | --- | --- |
| 29 | 92 | 1.8 | 5.4 | 0.8 | 1 |
| 30 | 92 | 1.5 | 4.5 | 2 | 1.5 |
| 31 | 92 | 1.8 | 5.4 | 0.8 | 1.5 |

TABLE 5(a)-continued

| Sample No | Si₃N₄ (wt %) | Y₂O₃ (wt %) | La₂O₃ (wt %) | SrO (wt %) | SiC (volume %) |
|---|---|---|---|---|---|
| 32 | 92 | 1.5 | 4.5 | 2 | 1.5 |
| 33 | 92 | 1.8 | 5.4 | 0.8 | 1.5 |
| 34 | 92 | 1.8 | 5.4 | 0.8 | 1.5 |
| 35 | 92 | 1.8 | 5.4 | 0.8 | 1.5 |
| 36 | 92 | 1.6 | 4.9 | 1.5 | 1.5 |
| 37 | 92 | 1.6 | 4.9 | 1.5 | 1.5 |
| 38 | 92 | 1.8 | 5.4 | 0.8 | 1.5 |
| 39 | 92 | 1.6 | 4.9 | 1.5 | 1.5 |
| 40 | 92 | 1.6 | 4.9 | 1.5 | 1.5 |

TABLE 5(b)

| Sample No. | Initial $T_1$(°C.)/ $t_1$(hr) | Intermediate $T_2$(°C.)/ $t_2$(hr) | Final $T_3$(°C.)/ $t_3$(hr) | R.T. Strength (MPa) | Ave. R.T. Fracture origin Size (μm) |
|---|---|---|---|---|---|
| 29 | RAMP*/0.5 | 2000/3 | 2050/3 | 742 | 41 |
| 30 | RAMP*/0.75 | 1950/1 | 2050/4.5 | 791 | 28 |
| 31 | " | 1950/1 | 2050/4.5 | 736 | 30 |
| 32 | " | 1950/2 | 2050/5 | 800 | 32 |
| 33 | " | 1950/2 | 2050/5 | 797 | 39 |
| 34 | " | 1900/2 | 2050/4.5 | 798 | 28 |
| 35 | " | 1950/1 | 2050/4.5 | 754 | 36 |
| 36 | " | 1950/1 | 2050/4.5 | 766 | 38 |
| 37 | " | 1900/2 | 2020/4 | 813 | 29 |
| 38 | " | 1900/2 | 2020/4 | 756 | 33 |
| 39 | " | 1950/2 | 2020/4 | 770 | 36 |
| 40 | RAMP*/1 | 1975/2.5 | 2020/3 | 804 | 28 |

Note
*1500 to 1850°C.

TABLE 6(a)

| Sample No | Si₃N₄ (wt %) | Y₂O₃ (wt %) | La₂O₃ (wt %) | SrO (wt %) | SiC (volume %) |
|---|---|---|---|---|---|
| 41 | 92 | 1.8 | 5.4 | 0.8 | 1 |
| 42 | 92 | 1.6 | 4.9 | 1.5 | 1.5 |
| 43 | 92 | 1.8 | 5.4 | 0.8 | 1.5 |
| 44 | 92 | 1.8 | 5.4 | 0.8 | 1.5 |
| 45 | 92 | 1.7 | 5.1 | 1.2 | 1.5 |
| 46 | 92 | 1.6 | 4.9 | 1.5 | 1.5 |
| 47 | 92 | 1.6 | 4.9 | 1.5 | 1.5 |
| 48 | 92 | 1.6 | 4.9 | 1.5 | 0.8 |
| 49 | 92 | 1.6 | 4.9 | 1.5 | 1.5 |
| 50* | 92 | 1.6 | 4.9 | 1.5 | 1.5 |
| 51 | 92 | 1.6 | 4.9 | 1.5 | 1.5 |
| 52* | 92 | 1.6 | 4.9 | 1.5 | 1.5 |
| 53 | 92 | 1.6 | 4.9 | 1.5 | 0.8 |
| 54 | 92 | 1.6 | 4.9 | 1.5 | 1.5 |
| 55 | 92 | 1.7 | 5.1 | 1.2 | 1.5 |
| 56* | 92 | 1.6 | 4.9 | 1.5 | 1.5 |
| 57* | 92 | 1.6 | 4.9 | 1.5 | 0.8 |
| 58 | 92 | 1.6 | 4.9 | 1.5 | 0.8 |

*Silicon Nitride Powder with 1.5% Oxygen

TABLE 6(b)

| Sample No. | Initial $T_1$(°C.)/ $t_1$(hr) | Intermediate $T_2$(°C.)/ $t_2$(hr) | Final $T_3$(°C.)/ $t_3$(hr) | R.T. Strength (MPa) | Ave. R.T. Fracture origin Size (μm) |
|---|---|---|---|---|---|
| 41 | 1650/2 | RAMP*/0.5 | 2050/5 | 770 | 29 |
| 42 | 1650/2 | 1950/1 | 2020/4 | 820 | 24 |
| 43 | 1650/2 | 1950/3 | 2020/3 | 811 | 29 |
| 44 | 1650/2 | 1975/2.5 | 2020/3 | 791 | 28 |
| 45 | " | " | " | 808 | 26 |
| 46 | 1750/2 | 1975/2.5 | 2020/3 | 821 | 26 |
| 47 | 1650/2 | 1975/2.5 | 2020/2 | 829 | 26 |
| 48 | " | " | " | 824 | 26 |
| 49 | 1650/2 | 1950/2.5 | 2020/2 | 843 | 24 |
| 50 | " | " | " | 852 | 21 |
| 51 | 1800/2 | 1950/2.5 | 2020/2 | 857 | 19 |
| 52 | " | " | " | 834 | 23 |
| 53 | " | " | " | 831 | 26 |
| 54 | 1650/6 | 1950/2.5 | 2020/2 | 836 | 26 |
| 55 | " | " | " | 854 | 27 |
| 56 | " | " | " | 874 | 20 |
| 57 | 1850/2 | 1950/2.5 | 2020/2 | 882 | 22 |
| 58 | " | " | " | 826 | 28 |

*1850 to 2000° C.

Some of the samples in this example are prepared from a silicon nitride powder having similar characteristics as the powder used in the previous examples but containing 1.5% by weight of oxygen. Furthermore, some of the green bodies in this example were fabricated using slipcasting, which involves milling about 70% by weight powders and 30% by weight water (ph adjusted to about 9) with silicon nitride grinding media in a high density polyethylene bottle or a urethanelined container for 24 hours. The resulting slip was then casted into a mold with plaster at the bottom to eventually form a block having a green dimension of about 2.6" by 2.6" by 1".

The compositions listed in Table 5(a) were then fired according to the condition shown Table 5(b), and the compositions listed in Table 6(a) were fired according to Table 6(b). Notice that the manufacture of sample Nos. 29 to 40 (Table's 5(a) and (b)) is similar to that of the previous samples, while sample Nos. 41 to 58 (Table's 6(a) and (b)) were fabricated using a sintering process consisting of an initial firing between 1500° and 1850° C. for more than 1 hour, an intermediate firing between 1850° and 2000° C. for at least 30 minutes, and a final firing between 2000° and 2050° C. for at least one hour but no more than 5 hours.

The microstructure of representative samples are characterized and shown in Table 7, in which we see that the average grain width is between about 0.5 and 0.8 μm, and at least 25% of the grains have width greater than 0.6 μm, and at least 10% of the grains have width greater than 0.9 μm, and less than 5 percent of the grain having width greater than 2.5 μm and apparent aspect ratio greater than 5, and the average apparent aspect ratio is about 2.

The room temperature strength listed in Table's 5(b) and 6(b) shows a value of at least 600 MPa. We have conducted extensive fractography analysis on all the broken test bars of samples Nos. 29 to 58, and have found that greater than 90%, and very often up to 100%, of the bars from each sample fracture from large β silicon nitride grains. We can see from Table 6(b) that the average fracture origin sizes for these samples are all smaller than 30 but larger than 15 μm, whereas from Table 5(b) we see that the fracture origin sizes are more scattered, with most of them greater than 30 μm but all are smaller than 50 μm.

TABLE 7

| Sample No | Cumulative Grain Width (μm) Distribution | | | | | Aspect Ratio Distribution | |
|---|---|---|---|---|---|---|---|
| | Average | 75% | 90% | 95% | 99% | Average | 95% |
| 32 | 0.72 | 0.89 | 1.22 | 1.46 | 2.20 | 2.02 | 3.78 |
| 33 | 0.74 | 0.91 | 1.26 | 1.53 | 2.17 | 2.05 | 3.43 |
| 43 | 0.63 | 0.79 | 1.11 | 1.37 | 1.99 | 2.04 | 3.92 |
| 48 | 0.68 | 0.85 | 1.17 | 1.43 | 2.11 | 2.03 | 3.95 |
| 51 | 0.60 | 0.75 | 1.08 | 1.30 | 1.77 | 2.04 | 4.0 |
| 52 | 0.61 | 0.77 | 1.08 | 1.28 | 1.66 | 1.99 | 3.73 |

Figure 3:
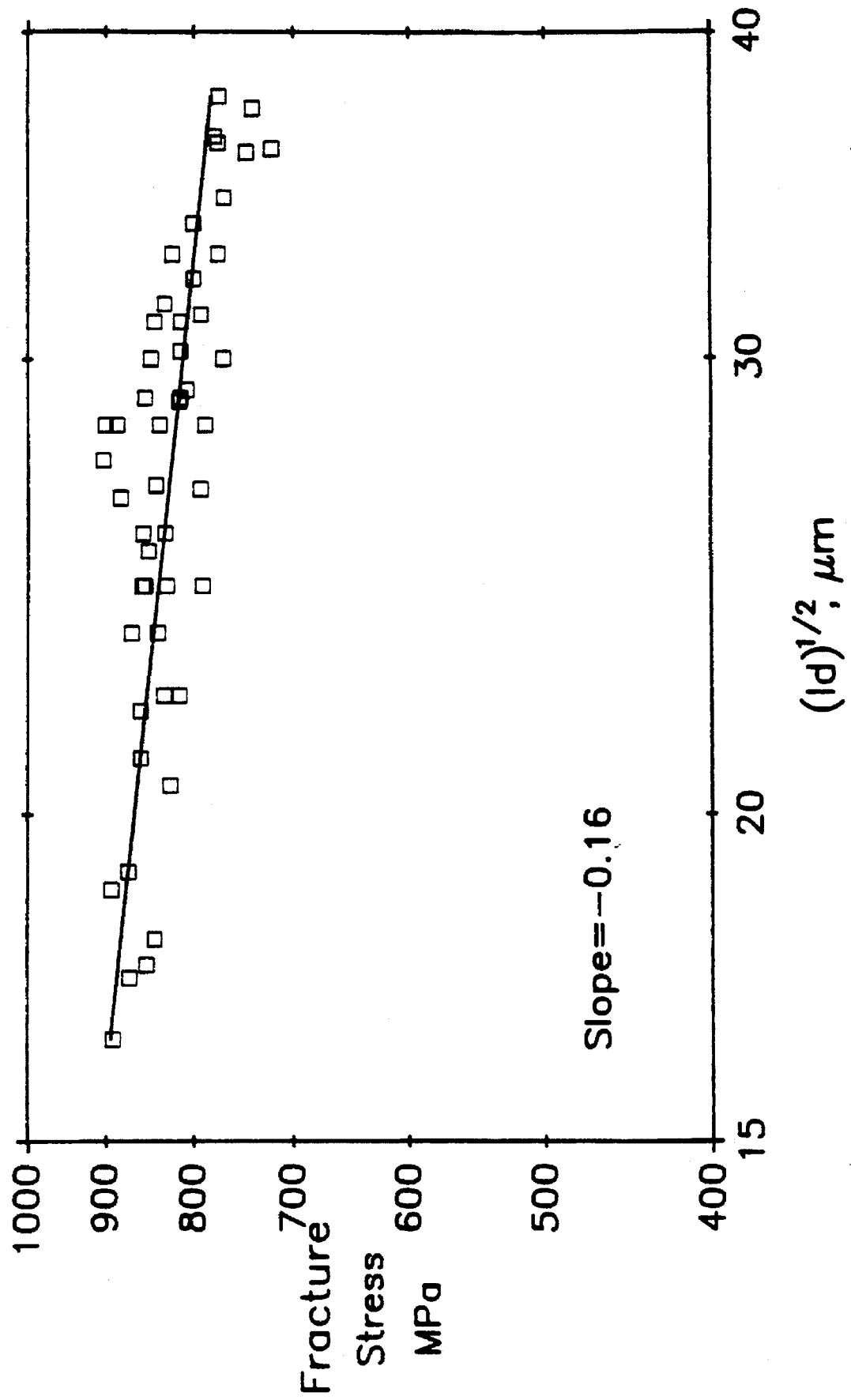
FIG. 3 is a plot showing the relationship between the average room temperature strength and the average size of the fracture origins which are large acicular β $Si_3N_4$ grains for the material of this invention.

Furthermore, we have conducted extensive fractography on silicon nitride sintered bodies having compositions and microstructures set forth in this invention, and established a relation between the average size of the fracture origins (large acicular $\beta Si_3N_4$ grains) and the average strength, as shown in FIG. 3. The upper and lower lines in FIG. 3 can be expressed by the equation $$log y = A - z log x$$

where:
- x=average fracture origin size (μm),
- y=average 4point bend strength (MPa),
- z=the absolute value of the slope of the line
- A=constant A is equal to 7.59 and 7.42 for the upper and lower lines, respectively, and z is equal to 0.25 for both lines.

Figure 4:
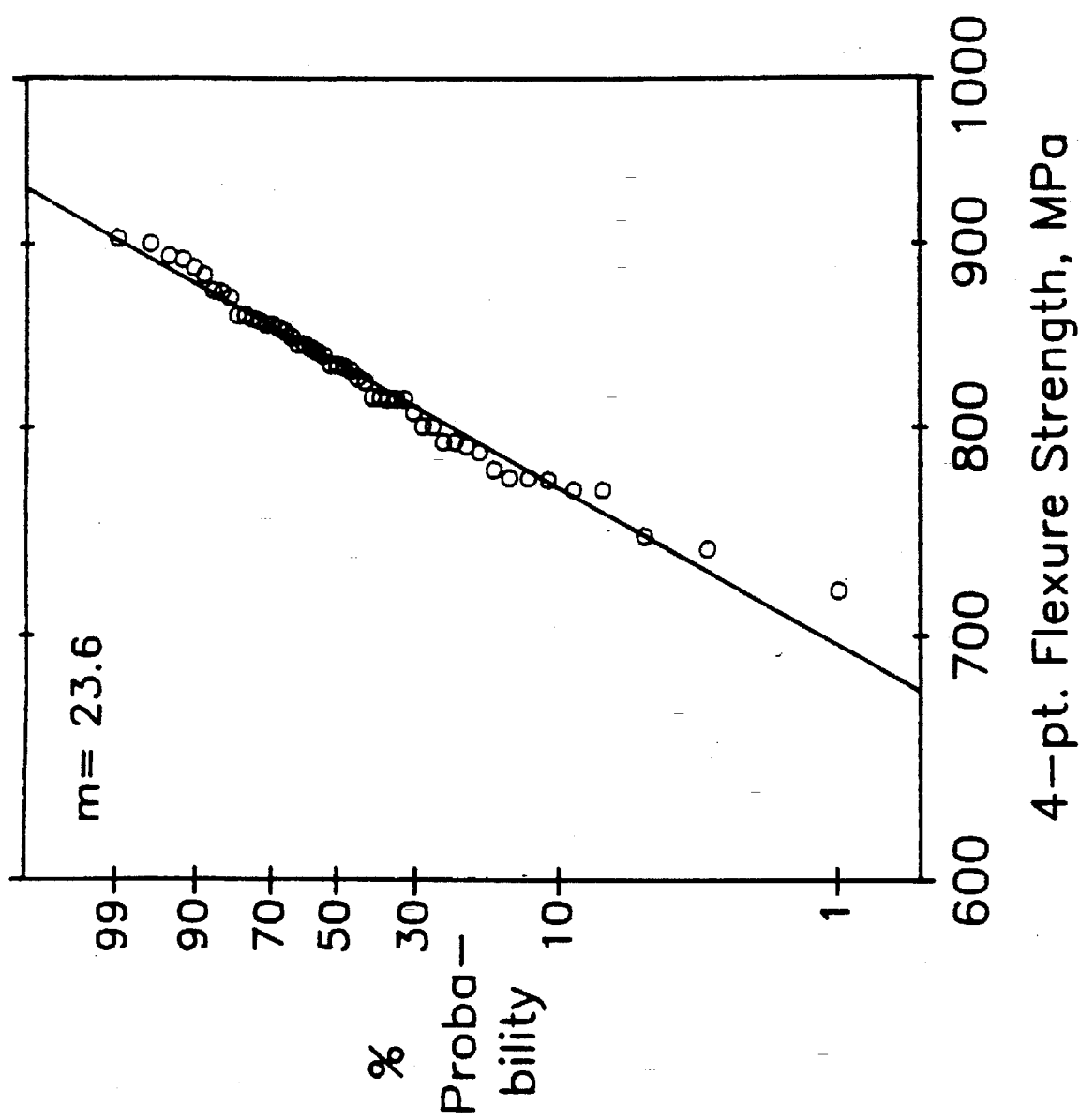
FIG. 4 is a plot showing the Weibull strength distribution for sample No. 58.
Figure 5:
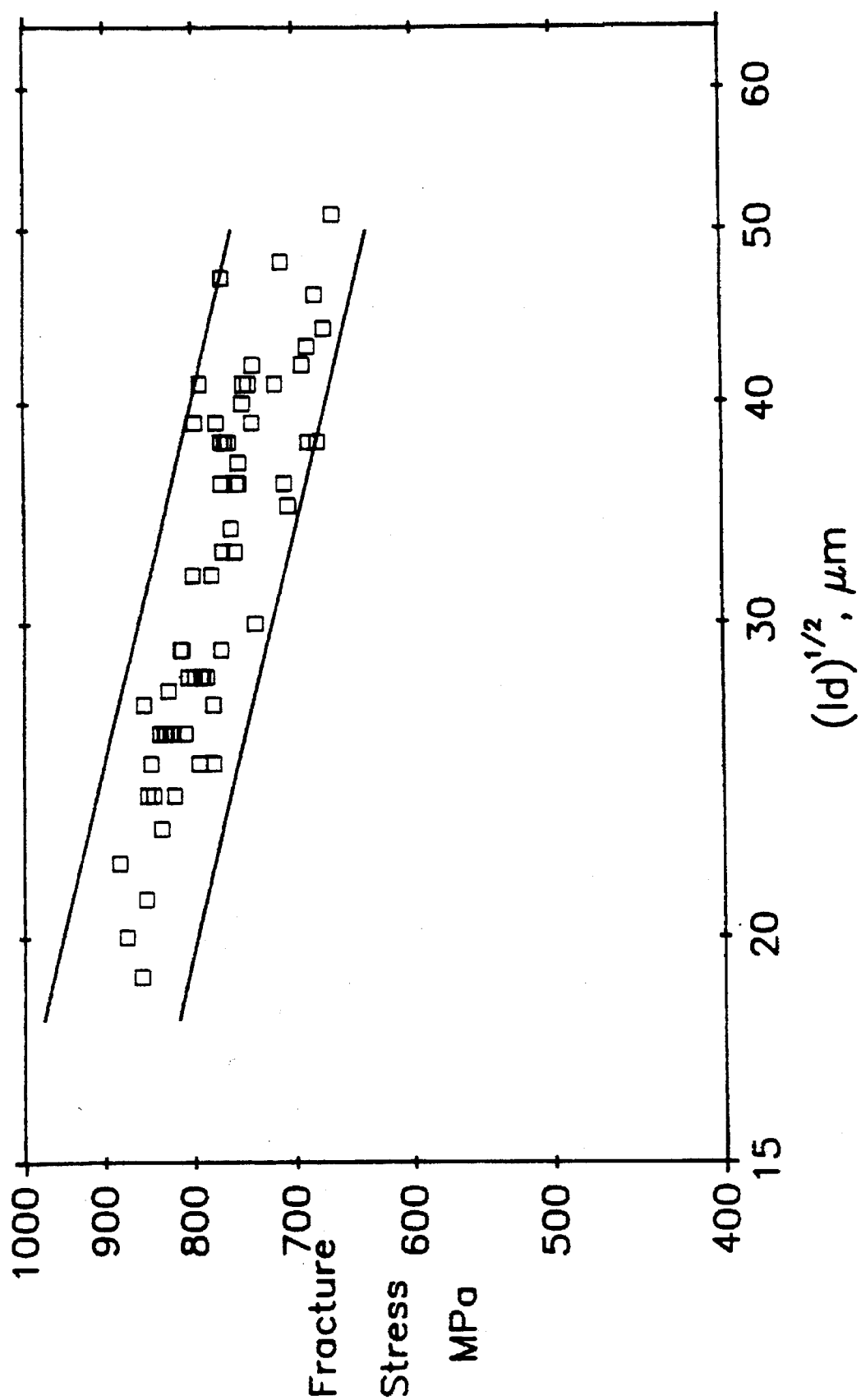
FIG. 5 is a plot showing the relationship between the fracture stress and the size of the fracture origin which is a large acicular β$Si_3N_3$ grain for every test specimen of sample No. 58.

The Weibull modulus for the product of this invention is obtained by a least-squares regression analysis of the fast fracture strength, having a large acicular $\beta Si_3N_4$ grain as the fracture origin, and the failure probability P which has the formula $$P = \frac{(i - 0.5)}{N}$$

where i is the ith specimen, and N is the total number of specimens for the sample (G. D. Quinn, J. Am. Ceram. Soc., 73 [8] 237484 (1990)). The Weibull moduli for representative samples along with their indentation strengths are shown in Table 8. The Weibull plot for sample No. 58, and the corresponding fracture stress fracture origin size relationship, are shown in FIG. 4 and 5, respectively.

TABLE 8

| Sample No. | Weibull Modulus | Indentation Strength (MPa) | |
|---|---|---|---|
| | | 1 kg | 50 kg |
| 35 | 21 | 610 | 260 |
| 40 | 19 | 621 | 238 |
| 43 | 21 | 634 | 255 |
| 44 | 25 | 634 | 252 |
| 46 | 23 | 676 | 255 |
| 50 | 22 | 635 | 262 |
| 52 | 31 | 683 | 256 |
| 58 | 24 | 680 | 259 |

As we can see from Table 8, the Weibull moduli for the products of this invention having the large acicular $\beta Si_3N_4$ grains as the fracture origin are all greater than 19. Furthermore, the indentation strength reveals that theses samples all have high fracture toughness and, therefore, exhibit the damage tolerant property.

High Weibull modulus is a highly desirable property for structural ceramics. The unusually high Weibull modulus for the silicon nitride of this invention is a result of its unique microstructure which results in the Rcurve behavior. This attribute can be more clearly depicted by the slopes of the lines shown in FIG. 3 and FIG. 5, which all show negative values much larger than 0.5. The value of 0.5 corresponds to conventional silicon nitride ceramics which have a fine microstructure, low fracture toughness, and do not exhibit R-curve behavior. A larger negative slope means that the material's strength is less sensitive to the variation in size of the flaws. This relationship is equivalent to stating that the materials of the present invention have high Weibull modulus, as is well documented in this specification.

Stress rupture testing is a common method used in evaluating the reliability of a part. Sample No.s 40, 44, 46, 52, 55 are stress rupture tested at 1200° C. at various stress levels starting from 483 MPa, and show a lifetime greater than 100 hours at 483 MPa. This lifetime is much higher than the lifetime for the conventional silicon nitride ceramics (G. D. Quinn, J. Mater. Sci., 25, 436192 (1990)). Such improvement is due to improved composition and microstructure which enhance the resistance to slow crack growth and creep damage at high temperatures.

What is claimed is:

1. A silicon nitride sintered body having a composition consisting essentially of:

(a) 85 to 94% by weight β silicon nitride;

(b) 6 to 15% by weight grain boundary phases consisting essentially of (i) at least two rare earth elements, wherein yttrium is considered a rare earth, (ii) strontium which, calculated as SrO, is present up to 2 percent by weight of the total body, and (iii) at least two of Si, N, O and C; and (c) an additive consisting essentially of a metal-carbon compound present in the amount of about 0.2 to 3.5% by volume per 100 parts by volume of components (a) and (b), said additive being substantially homogeneously dispersed within said sintered body, said sintered body having a microstructure wherein (i) said β silicon nitride grains are acicular and have an average grain width ranging from 0.5 to 1.5 μm, (ii) at least 25% of said grains have width greater than 0.7 μm, and at least 10% of said grains have width greater than 1 μm, and (iii) no more than 5% of said grains have width greater than 3.5 μm and apparent aspect ratio greater than 5, with the proviso that the average aspect ratio of all grains is at least 1.8, said sintered body having a density at least 95% of theoretical and a fracture origin, at least 90% of which is comprised of large acicular $\beta Si_3N_4$ grains and the average size of which ranges from about 15 to 50 μm.

2. A silicon nitride sintered body having a composition consisting essentially of:

(a) 85 to 94% by weight β silicon nitride;

(b) 6 to 15% by weight grain boundary phases primarily consisting of (i) at least two rare earth elements, wherein yttrium is considered a rare earth, (ii) strontium present up to 2 percent by weight of the total body when calculated as SrO, and (iii) at least two of Si, N, O and C; and (c) an additive consisting essentially of silicon carbide particulate with an average size less than 2 μm in the amount ranging from about 0.5 to 1.9 parts by volume per 100 parts by volume of components (a) and (b), said sintered body having a microstructure wherein (i) said β silicon nitride grains are acicular and have an average grain width ranging from 0.5 to 0.8 μm, (ii) at least 25% of said grains have width greater than 0.6 μm, and at least 10% of said grains have width greater than 0.9 μm, and (iii) less than 5 percent of the grains having width greater than 2.5 μm and apparent aspect ratio greater than 5, with the proviso that the average aspect ratio of all grains is at least about 1.8, said sintered body having a density at least 97% of theoretical and a fracture origin, at least 90% of which is comprised of large acicular βSi$_3$N$_4$ grains and the average size of which ranges from about 15 to 30 μm.

3. A silicon nitride sintered body as recited in claim 1, having a four point flexure strength and a fracture origin defined by the formula:

$$log y = A - z log x$$

wherein x is the fracture origin size (μm), y is the 4-point bend strength (MPa), A is a constant between about 7 and 8, and z is equal to or less than 0.25.

4. A silicon nitride sintered body as recited by claim 2, having a Weibull modulus of at least 19.

5. A silicon nitride sintered body as recited by claim 1, wherein said metal carbon compound is a carbide, nitro-carbide or oxynitro-carbide and said metal is one element selected from the group consisting of Si, Ti, Hf, Zr, Ta, and V.

6. A silicon nitride sintered body as recited by claim 5, wherein said metal-carbon compound is selected from the group consisting of silicon carbide, titanium carbide, hafnium carbide and tantalum carbide.

7. A silicon nitride sintered body as recited by claim 1, having a chevron-notch fracture toughness greater than 7.5 MPa·m$^{0.5}$ and indentation strengths greater than 500, 400, 350, 300, 270 and 220 MPa at indentation loads of 1, 5, 10, 20, 30 and 50 kg, respectively.

8. A silicon nitride sintered body as recited by claim 1, having a four-point flexural strength of at least 600 MPa at room temperature and at least 450 MPa at 1375° C.

9. A silicon nitride sintered body as recited by claim 2, having yttrium and lanthanum as rare earth elements in the grain boundary phases with yttrium calculated as Y$_2$O$_3$, ranging from 1 to 5 wt. % and lanthanum, calculated as La$_2$O$_3$, ranging from 3 to 8 wt. %.

10. A silicon nitride sintered body as recited by claim 2, having a chevron-notch toughness greater than 7.5 MPa·m$^{0.5}$, indentation strengths greater than 500, 400, 350, 300, 270 and 220 MPa at indentation loads of 1, 5, 10, 20, 30 and 50 kg, respectively, and 4-point flexural strength of at least 790 MPa at room temperature and at least 450 MPa at 1375° C.

11. A silicon nitride sintered body as recited in claim 2, wherein said grain boundary phases are substantially crystalline and are formed or recrystallized by annealing at temperatures of at least 1375° C.

12. A silicon nitride sintered body as recited by claim 1, said body having been sintered by a process having at least two steps, wherein:

(a) at least a first of the steps is carried out at a temperature between 1800° and 2000° C. and for a time ranging from about 1 to 10 hours in order to prepare an intermediate ceramic;

(b) at least a succeeding one of the steps is carried out at a temperature ranging from about 2000° to 2100° C. and for a time ranging from about 1 to 10 hours in order to heat treat the intermediate ceramic;

(c) each of the steps being carried out under nitrogen pressure sufficiently high to avoid decomposition of silicon nitride, and the temperature of the succeeding steps being at least 25° C. greater than that of the first of the steps.

13. A silicon nitride sintered body as recited by claim 2, said body having been sintered by a process consisting of firing in the temperature range of 1500° C. to 2045° C., wherein:

(a) an initial sintering is carried out at a temperature between 1500° and 1850° C. for a time greater than one but less than eight hours;

(b) an intermediate sintering is carried out at a temperature between 1850° and 2000° C. for at least 30 minutes but less than five hours;

(c) a final sintering is carried out at a temperature ranging from about 2000° to 2045° C. for a time ranging from about one to five hours;

(d) each of the steps being carried out under nitrogen pressure sufficiently high to avoid decomposition of silicon nitride, and the temperature of the succeeding steps being at least 25° C. greater than that of the first of the steps.

* * * * *